United States Patent [19]
Griffanti

[11] Patent Number: 5,408,076
[45] Date of Patent: Apr. 18, 1995

[54] METHOD AND WORK CARD FOR KEYING IN OPERATING CYCLES TO ELECTRONIC CONTROL UNITS IN SEWING MACHINES

[75] Inventor: Nello Griffanti, Castano Primo, Italy

[73] Assignee: Rimoldi, S.r.l., Milan, Italy

[21] Appl. No.: 4,433

[22] Filed: Jan. 14, 1993

[30] Foreign Application Priority Data

Feb. 28, 1992 [IT] Italy ............... MI92A0456

[51] Int. Cl.6 ............................................. G06F 15/20
[52] U.S. Cl. .................................... 235/375; 235/487
[58] Field of Search ............... 235/375, 462, 472, 487

[56] References Cited

U.S. PATENT DOCUMENTS

| | | | |
|---|---|---|---|
| 4,323,773 | 4/1982 | Carpenter | 235/473 |
| 4,475,153 | 10/1984 | Kihara | 364/145 |
| 4,516,016 | 5/1985 | Kodron | 235/472 |
| 4,535,204 | 8/1985 | Hughes | 179/90 BD |
| 4,837,414 | 6/1989 | Edamula | 219/10.55 B |
| 4,841,132 | 6/1989 | Kajitani | 235/472 |

*Primary Examiner*—John Sheppard
*Assistant Examiner*—Karl D. Frech
*Attorney, Agent, or Firm*—Laff, Whitesel, Conte & Saret, Ltd.

[57] ABSTRACT

In the described method, for keying-in of a given operating cycle a plurality of bar codes is provided to be sequentially inputted to an electronic control unit (114) with the aid of an optical detector (126), each bar code corresponding to a specific operation to be executed on a workpiece (116) for carrying out a particular working. The bar codes (125) are reproduced on respective adhesive labels (127) applied to a work card (115) carrying the workpiece depiction, each code (125) being disposed close to a corresponding area of the workpiece (116) on which the corresponding working is to be made.

4 Claims, 2 Drawing Sheets

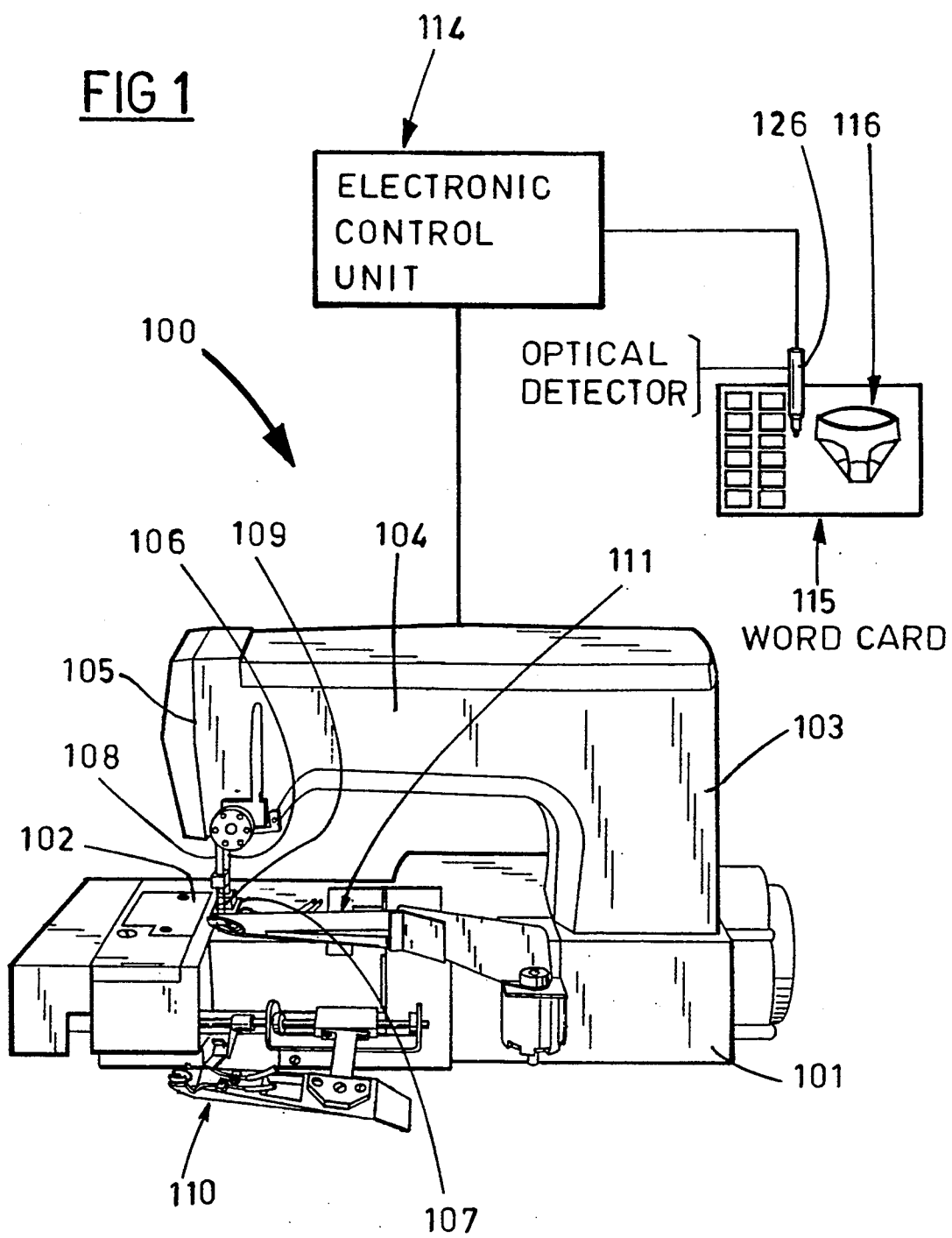

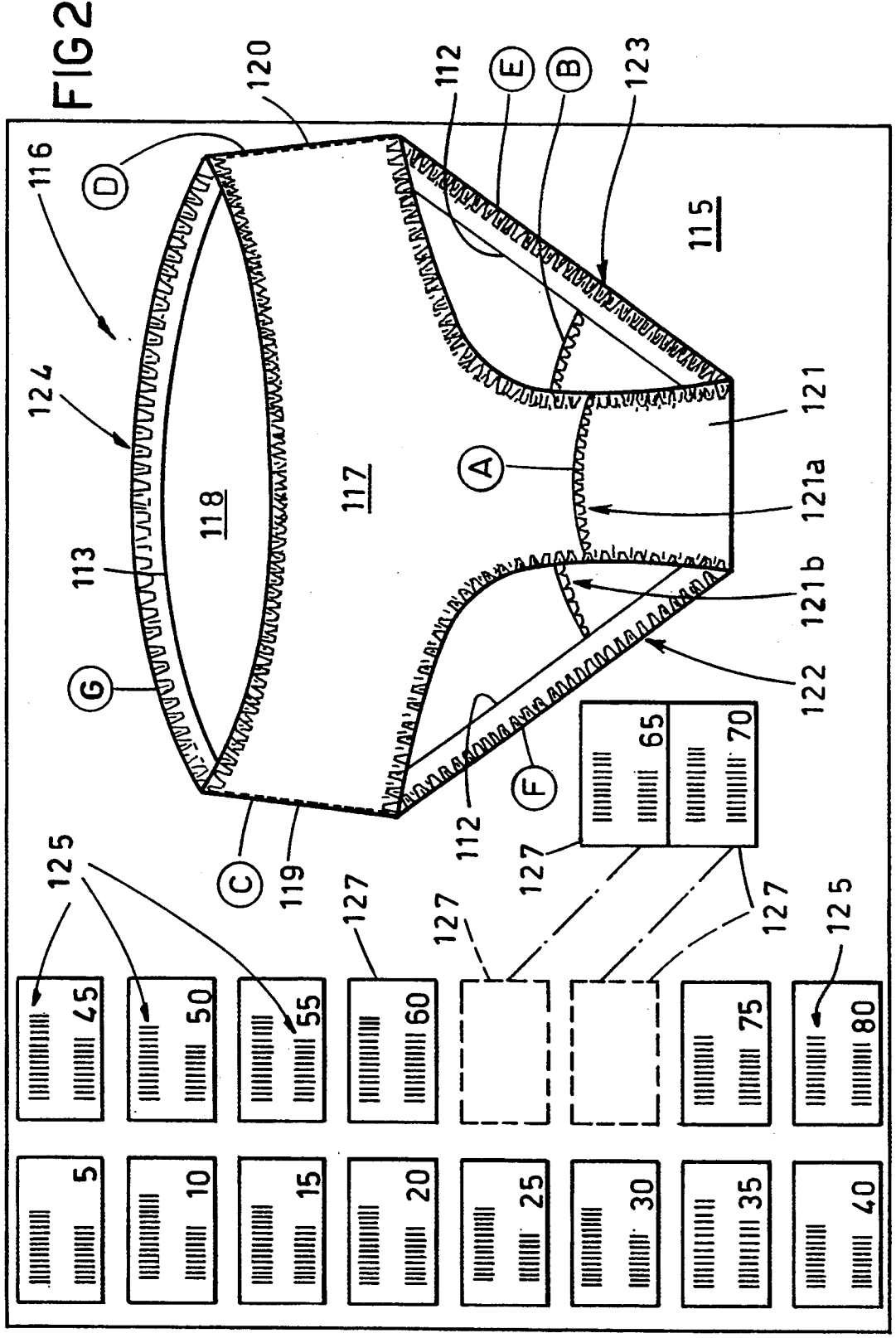

METHOD AND WORK CARD FOR KEYING IN OPERATING CYCLES TO ELECTRONIC CONTROL UNITS IN SEWING MACHINES

BACKGROUND OF THE INVENTION

1. Field of the Invention

The present invention relates to a method and work card for inputting operating cycles to electronic control units in sewing machines, involving the use of an electronic control unit in which a plurality of instructions is stored to be sequentially sent to the sewing machine for controlling operation thereof.

In particular, the invention is adapted to be used in combination with industrial use sewing machines, generally providing for repeated operating cycles to be executed for an indefinite number of times, each comprising a specific working sequence of different type.

2. Prior Art

It is known that in the field of sewing machines, in particular industrial use sewing machines, technical solutions have been recently developed according to which operation of the machine as well as the various accessory devices associated therewith, is fully controlled by an electronic control unit.

This electronic control unit is such programmed that operation of the sewing machine takes place according to a predetermined operating cycle consisting of a previously inputted sequence of workings. For each of said workings many parameters are required to be specifically inputted to the sewing machine, such as for example length of the sewing stitch, possible puckering of the workpiece at the sewing, possible insertion of rubber bands or reinforcing ribbon-like laces and still others.

The electronic control unit is capable of carrying out inputtings to the sewing machine at the beginning of each working provided in the operating cycle in a quick and precise manner, so that the operator's work can be greatly facilitated. Practically, the operator's task substantially consists in positioning the workpiece under the machine presser foot and commanding starting of working that will then go on under the control of the electronic unit.

By adopting these electronic control units therefore, training of the staff assigned to the use of the sewing machine has been greatly facilitated and simultaneously an important increase in productivity has been achieved together with a great reduction in working rejections due to mistakes by the operator and a remarkable increase in the operating flexibility of the sewing machines.

It is to be pointed out however that at the present state of the art electronic control units give rise to many-difficulties in programming.

In fact, keying-in of any operating cycle to the electronic control unit takes place by sequentially inputting a great number of elementary instructions into the unit memory, to each of said instructions corresponding, within the sewing machine operation, activation and deactivation of a given device or servomechanism such as for example a motors, solenoid valve, photoelectric cell or others. For programming purposes it is therefore necessary to avail oneself of the intervention of a person that not only has a certain A knowledge in the field of computers and the like, but is also perfectly acquainted with all technical and operating features of the machine. The concerned person must for example know all diagrams for electric and hydropneumatic connections between the various actuators, solenoid valves and other devices currently provided in sewing machines.

As a result, at the present time the electronic control unit must be necessarily programmed by highly qualified technicians.

In addition, in order to give the sewing machine sufficient practicality and operating flexibility, provision is made for a plurality of different operating cycles to be previously inputted and stored in the electronic control unit during the sewing machine manufacture, which cycles will be selectively used case by case by the final users, depending on the different requirements. Practically, the final user that begins using the sewing machine will be able to select the operating cycle which is best suited to the type of manufactured article he intends to produce, by retrieving it by means of a numeric, alphabetic or alphanumeric code.

The necessity of developing and inputting a great number of programs relating to the different operating cycles to the electronic control units however involves the adoption of electronic units having high storage capacity, and a vast amount of work is required, which will bring about economical consequences. In the connection it will be recognized that said programs must be necessarily studied so that each of them may as much as possible meet the different operating requirements of any user to whom the sewing machine is destined. This condition inevitably involves the creation of programs for operating cycles that, while being on the one hand very versatile, on the other hand are not always capable of meeting the particular operating requirements arising each time in use.

It is noted in fact that often a program previously inputted for a given operating cycle must be modified at the moment of use of the sewing machine. In these cases need for the intervention of highly qualified technicians brings about further problems.

SUMMARY OF THE INVENTION

Under this situation the main object of the present invention is substantially to solve the drawbacks of the known art by providing a method that, with the aid of an appropriate programming table, makes it possible to carry out inputting of any operating cycle directly by the final user of the sewing machine.

The foregoing and further objects that will become more apparent in the course of the present description are substantially attained by a method of keying in operating cycles to electronic control units in sewing machines, which method comprises a selective batching of said instructions to form a plurality of instruction batches individually identified by respective identification codes and each corresponding to at least one specific operation included within the execution scope of a specific working by the sewing machine, said keying-in of the operating cycle comprising the following steps: identifying a sequence of workings to be executed for carrying out an operating cycle relating to the production of a given manufactured article; selecting the operations to be executed for carrying out the individual workings provided in said sequence; transmitting to the electronic control unit, according to an order corresponding to said working sequence, the identification codes of the instruction batches corresponding to the selected operations for the individual workings, said identification codes being sequentially stored in the electronic unit for defining said operating cycle.

BRIEF DESCRIPTION OF THE DRAWINGS

Further features and advantages will become more apparent from the detailed description of a preferred embodiment of a method and work card for keying in operating cycles to electronic control units in sewing machines in accordance with the present invention. This description will be given hereinafter by way of non-limiting example with reference to the accompanying drawings, in which:

FIG. 1 shows, by way of indication, a sewing machine together with an electronic control unit associated therewith and a work card used in accordance with the present invention for keying in the sewing machine operating cycles;

FIG. 2 shows said work card in more detail.

DESCRIPTION OF THE PREFERRED EMBODIMENT

Referring particularly to FIG. 1, a sewing machine for industrial use has been generally identified by reference numeral 100. It is arranged to produce manufactured articles by operating cycles that, according to the method in reference, lend themselves to be keyed in by turns depending on the type of manufactured article being worked.

In a manner known per se, the sewing machine 100 shown and briefly described comprises a bed 101 on top of which a substantially horizontal supporting surface 102 for a workpiece not shown is defined. Standing from the bed 101 is a standard 105 from which an overhanging bracket arm 104 extends, terminating with a head 105.

Operatively housed in the head 105 is a presser bar 106 carrying a presser foot 107 at the lower part thereof, which foot is elastically pushed against the workpiece for ensuring its being seized by feed dogs acting through the supporting surface 102 and not shown as known per se.

In addition, slidably guided in the head 105 is a needle bar 108 carrying one or more needles 109 at the lower part thereof. The needles are conventionally reciprocated across the supporting surface 102 so that they pass through the workpiece and cooperate with further sewing instrumentalities (not shown as known) housed in the bed 101 for sewing purposes.

Various accessory devices may also be associated with the sewing machine 100 and they are individually and selectively activated depending on requirements for executing different workings provided in the machine operating cycle. The accessory devices shown in FIG. 1 by way of example consist of a first and a second feed guide 110, 111, for ribbon-like inserts, such as for example a first and a second rubber band 112, 113, (FIG. 2) of different widths. Each of the first and second feed guides 110), 111 is selectively movable from a rest condition in which (as shown with reference to the first guide 110) it is moved apart from the needles 109, to an operating condition in which (as shown with reference to the second guide 111), it is disposed close to the needles for feed-advancing of the corresponding rubber band.

Depending on requirements, many other accessory devices not shown as known and not of importance to the ends of the invention may be associated with the sewing machine 100.

Still in known manner, an electronic control unit is associated with the sewing machine 100. Said electronic unit has been diagrammatically shown in FIG. 1 and denoted by reference numeral 114, its function being substantially that of driving the sewing machine in operation according to the modalities provided in a given operating cycle suitably selected depending on the particular features of the manufactured article to be made.

For the sake of clarity, it is to be pointed out that to the ends of the present invention the operating cycle is considered as comprised of a sequence of specific workings, each of which corresponds to the execution of a complete seam on the workpiece. Each of these workings is in turn considered as comprised of a sequence of specific operations. For example, the execution of a seam involving the simultaneous insertion of a rubber band along one edge of a workpiece, to be generally considered as a "working", can be comprised of a sequence of operations such as positioning of the rubber band end at the sewing area, execution of one or more consecutive seam portions of a given length and finally cutting of the rubber band and the sewing threads.

As can be easily supposed, for the execution of each of these operations the selective actuation of given devices and servomechanisms is required, such as for example solenoid valves, motors, photoelectric cells or others, provided in the sewing machine 100.

In this connection, in the electronic control unit 114, within a fixed memory of the type commonly known as "EPROM", a plurality of elementary instructions is stored, each of which is adapted to be sent to the sewing machine 100 for driving the selective operation of one of said devices or servomechanisms.

Inputting of the elementary instructions to the EPROM is carried out by skilled persons, during the manufacture of the sewing machine 100 for example, according to a modality that, based on the method in reference, involves a selective batching of the instructions to form a plurality of instruction batches, each comprising a given number and a specific typology of elementary instructions.

Each of these instruction batches can be identified, as better clarified in the following, by a corresponding identification code and contains the sequence of elementary instructions necessary to carry out through corresponding commands given to the sewing machine 100, the execution of a given operation within the implementation of a specific working.

Advantageously, keying-in of the operating cycle based on the workpiece features can be executed in a very simple manner, even directly by the final user of the sewing machine 100, with the aid of a work card 115 being an integral part of the present invention too.

The work card 115, better shown in FIG. 2, in an original manner provides that a diagrammatic depiction 116 of the type of workpiece to be made be graphically reproduced on a plate-like paper medium. In the example of FIG. 2, the workpiece 116 to which the work card 115 is dedicated, consists of a pair of pants. Obviously, the accomplishment of several different work cards will be provided, on each of which a different type of workpiece will be reproduced such as for example a T-shirt, a pair of trousers or others.

Referring to the embodiment shown, the workpiece 116 essentially comprises a front portion 117 and a rear portion 118 joined to each other along a right side 119 and a left side 120, and a so-called "gusset" 121 the opposite ends of which 121a, 121b are joined to the front and rear portions, 117 and 118, respectively. The gusset sides 121 and the front and rear portions 117 and 118 define, on opposite sides, a right side opening 122 and a left side opening 123. To the edge of each of these openings optionally provided with a puckering said first rubber band 112 is applied.

The front and rear portions 117 and 118 further define an upper opening 124 to the edge of which, optionally provided with a corresponding puckering, said second rubber band 113 is applied.

In addition, a plurality of bar codes 125 is reproduced on the work card 115, each of said codes substantially constituting the identification code corresponding to a given instruction batch contained in said EPROM.

In other words, corresponding to each bar code 125 is a given operation susceptible of execution by the sewing machine 100.

Advantageously, with the aid of a conventional optical detector 126 associated with the electronic control unit 114, the individual bar codes 125 can be selectively transmitted following a preestablished sequence to an access memory of the so-called "RAM" type, provided in the electronic unit for defining the operating cycle that the sewing machine 100 must execute.

In greater detail, for keying-in of the operating cycle, in accordance with the method in question the user of the sewing machine 100 first identifies the working sequence that must be carried out for completion of the workpiece 116.

In other words, he/she must give a succession order to the workings to be carried out on the workpiece 116. Very useful to this end is the graphic representation of the workpiece 116 reproduced on the work card 115. In fact, the operator has the possibility of directly copying the working sequence into the graphic card by writing first progression indices, consisting for example of progressive numbers and/or, as in the example shown, letters in alphabetical order, each disposed close to a given area of the workpiece 116 at which the corresponding working is to be carried out.

The example shown in FIG. 2 clarifies the above concept. In fact, the alphabetical letters A, B, C, D, E, F, G reproduced close to the workpiece 116 indicate the following working sequence:

A) assembling of the gusset 121 to the front portion 117;
B) assembling of the gusset 121 to the rear portion 118;
C) mutual assembling of the front and rear portions 117 and 118, on the right side 119;
D) mutual assembling of the front and rear portions, 117 and 118, on the left side 120;
E) application of the first rubber band 112 to the left side opening 123;
F) application of the first rubber band 112 to the right side opening 122;
G) application of the second rubber band 113 to the upper opening 124.

After copying the identified working sequence into the work card 115, the operator for each of said workings must select the specific operations that, among the multiplicity of available operations, are adapted to drive the working in execution according to a desired modality.

For example, referring to workings "E" and "F", two different execution modalities could be respectively provided according to the presence or absence of puckering along the side opening edges. The operator will select those operations that are congenial with the achievement of the desired execution modality.

In order to facilitate selection by the operator, close to each bar code 125 provision may be made for a writing describing the corresponding operation.

Then the operator, using the optical detector 126, will transmit the bar codes 125 relating to the selected operations to the electronic unit 114, according to the order established by the working sequence A, B, C, D, E, F, G previously identified and copied into the work card 115.

In this way the identification codes for the instruction batches corresponding to the selected operations for each individual working are sequentially stored in the electronic control unit 114, so as to define the operating cycle according to which the sewing machine 100 will be driven in operation.

Advantageously, the instruction batches relating to the selected operations for carrying out a given working may be gathered so as to form a so-called "instruction batch assembly" which is stored in the electronic control unit 114 and marked by a corresponding identification code, so that it can be immediately retrieved during keying-in of a subsequent work cycle. This makes keying-in of subsequent work cycles easier, in that any working marked by an instruction batch assembly previously formed can be keyed in an immediate manner without being necessary to repeat the selection step for the individual operations.

In order that any operating cycle, once inputted to the electronic control unit 114, may be perfectly adapted to the different requirements as they occur, the operator may also be given the possibility of modifying some of the instructions contained in the different instruction batches forming the operating cycle previously planned and keyed in.

In particular, the operation of the sewing machine 100 can be adapted to several different factors that can be foreseen and/or quantified with difficulty. For example, the possibility may be offered of modifying in a given working, instructions concerning the pressure exerted by the presser foot on the workpiece, so as to ensure the correct feeding by the feed dogs, irrespective of the degree of smoothness afforded by the workpiece and/or tensioning manually exerted by the operator thereon.

In accordance with a further feature of the invention, in order to further facilitate keying-in of the operating cycle, a second index may be provided to be combined with each of the bar codes 125, which second index consists for example of an order number or equivalent identification means.

In FIG. 2 these second indices are indicated by a progressive numbering by five (5, 10, 15, ..., 80) shown in combination with the bar codes 125.

In this manner, the operator can, at the corresponding first progression indices A, B, C, D, E, F, G and the different areas of the workpiece 116 graphically represented in the work card 115, copy the order numbers of the bar codes 125 corresponding to the selected operations for carrying out workings in said areas.

Alternatively or in addition, the bar codes 125 can be reproduced each on an adhesive label 127 removably fastened to the paper medium forming the work card 115. As shown with reference to labels 127 carrying the bar codes 125 marked by order numbers 65 and 70, each label 127 is adapted to be applied to the vicinity of the workpiece 116 representation, close to the corresponding first progression order and at the area on which the corresponding working is going to be executed.

The work card 115 can therefore be filed away and reused an-indefinite number of times for inputting the corresponding operating cycle.

The present invention attains the intended purposes.

The invention in fact eliminates the necessity that a great number of operating cycles to be selectively used by the final users should be studied during the sewing machine manufacture and previously inputted to the electronic control unit. Attention is drawn to the fact that inputting these operating cycles is time consuming, also because they must be studied and devised so as to meet the different requirements of the final users.

In addition, time devoted to the accomplishment of most of the operating cycles is wasted time in that practically the final user only employs some of the operating cycles previously inputted.

On the contrary the method of the invention enables the final user to key in any operating cycle in a very simple manner, each operating cycle being on the other hand especially set up for a particular type of manufactured article to be made.

Thus, also the need for the intervention of highly qualified staff is eliminated, which was on the contrary necessary in the known art when one or more operating cycles previously inputted needed to be modified.

Advantageously, the method of the invention also makes it possible to employ electronic units having a storage capacity greatly lower than the capacity required in the known art, in that inputting of each work cycle substantially involves deleting of the operating cycle previously stored in the unit itself.

Obviously many modifications and variations may be made to the invention as conceived, all of them falling within the scope of the inventive idea characterizing it.

What is claimed is:

1. A method of inputting operating cycles to a sewing machine electronic control units involving the use of an electronic unit (114) in which a plurality of elementary instructions is stored to be sequentially sent to the sewing machine for driving the same in operation, which method comprises a selective batching of said elementary instructions to form a plurality of instruction batches capable of being individually identified by respective identification codes (125) and corresponding each to at least one specific operation included within the execution of a given working by the sewing machine (100), keying-in of the operating cycle comprising the following steps:

identifying a sequence of workings to be executed for carrying out an operating cycle relating to the production of a given workpiece (116);

selecting the specific operations to be executed for carrying out the individual workings provided in said identified sequence;

transmitting to the electronic control unit (114), according to an order corresponding to said working sequence, the identification bar codes (125) of the instruction batches corresponding to the selected operations for the individual workings, said identification codes (125) being sequentially stored in the electronic unit (114) for defining said operating cycle;

said identification codes (125) are in the form of bar codes disposed on a corresponding work card (115), the transmission of said codes to the electronic control unit (114) being carried out with the aid of an optical detector (126) associated with the electronic control unit; and wherein the identified working sequence is copied into said work card (115) by means of first progression indices (A, B, C, D, E, F), each of which corresponds to one of said workings and is disposed closed to a corresponding area of a workpiece (116) graphically reproduced on the work card (115).

2. A method of inputting operating cycles to a sewing machine electronic control unit involving the use of an electronic control unit (114) in which a plurality of elementary instructions is stored to be sequentially sent to the sewing machine for driving the same in operation, which method comprises a selective batching of said elementary instructions to form a plurality of instruction batches capable of being individually identified by respective identification codes (125) and corresponding each to at least one specific operation included within the execution of a given working by the sewing machine (100), keying-in of the operating cycle comprising the following steps:

identifying a sequence of workings to be executed for carrying out an operating cycle relating to the production of a given workpiece (116);

selecting the specific operations to be executed for carrying out the individual workings provided in said identified sequence;

transmitting to the electronic control unit (114), according to an order corresponding to said working sequence, the identification bar codes (125) of the instruction batches corresponding to the selected operations for the individual workings, said identification codes (125) being sequentially stored in the electronic unit (114) for defining said operating cycle;

further at least one step of assembling a plurality of instruction batches for defining at least one instruction batch assembly identified by a corresponding identification code (125) and corresponding to the execution of a specific working by the sewing machine (100);

said identification codes (125) being in the form of bar codes disposed on a corresponding work card (115), the transmission of said codes to the electronic control unit (114) being carried out with the aid of an optical detector (126) associated with the electronic control unit; and wherein the identified working sequence is copied into said work card (115) by means of first progression indices (A, B, C, D, E, F), each of which corresponds to one of said workings and is disposed close to a corresponding area of a workpiece (116) graphically reproduced on the work card (115).

3. The method as claimed in claim 1 or 2, wherein adjacent to each of said first progression indices (A, B, C, D; E; F), second indices (5, 10, . . . 75, 80) are copied which are individually combined with the bar codes (125) corresponding to the operations provided in the working marked by the progression index itself.

4. The method as claimed in claim 1 or 2, wherein adjacent to each said first progression indices (A, B, C, D; E, F) at least one adhesive label (127) associated with the work card (115) is applied, said label reproducing one of said bar codes (125).

* * * * *

UNITED STATES PATENT AND TRADEMARK OFFICE
CERTIFICATE OF CORRECTION

PATENT NO. : 5,408,076
DATED : April 18, 1995
INVENTOR(S) : Nello Griffanti

It is certified that error appears in the above-indentified patent and that said Letters Patent is hereby corrected as shown below:

Column 8, line 7, change "closed" to --close--.
Column 8, line 63, after "each" insert --of--.

Signed and Sealed this

Nineteenth Day of September, 1995

Attest:

BRUCE LEHMAN

Attesting Officer     Commissioner of Patents and Trademarks